March 31, 1953   W. S. OLIWA   2,633,566
ELECTROMAGNETIC INDICATOR AND POSITIONER
Filed April 19, 1951   2 SHEETS—SHEET 1

INVENTOR
WALTER S. OLIWA
BY
AGENT

March 31, 1953 W. S. OLIWA 2,633,566
ELECTROMAGNETIC INDICATOR AND POSITIONER
Filed April 19, 1951 2 SHEETS—SHEET 2

INVENTOR
WALTER S. OLIWA
BY
AGENT

Patented Mar. 31, 1953

2,633,566

UNITED STATES PATENT OFFICE 2,633,566

ELECTROMAGNETIC INDICATOR AND POSITIONER

Walter S. Oliwa, Orange, N. J., assignor to Monroe Calculating Machine Company, Orange, N. J., a corporation of Delaware Application April 19, 1951, Serial No. 221,835

1 Claim. (Cl. 340—373)

This invention relates to indicators and is particularly suitable for displaying the result of an operation of a remotely located device such as a computing machine or the like.

The general object of the invention is the provision of a remotely controlled, differentially settable indicator operating on the magnetic principle that a flux field tends to establish a path which will embody a maximum number of flux lines.

According to the invention, a rotor in the form of a circular band which tapers in axial width, has a suitable dial mounted for rotation therewith. A series of electromagnets, one for each indicating position of the dial, are spaced equi-angularly about the periphery of the rotor with their pole pieces so located as to utilize the material of the rotor as a low reluctance path therebetween. Energization of any of the electromagnets from a remote source effects a rotative movement of the rotor sufficient to position the widest portion thereof adjacent the pole pieces of the energized magnet. This effect is due to the inherent quality of a flux field to seek out a path of least reluctance, which, in the instant device, is the widest portion of the rotor band.

In one form of the invention, the rotor band tapers unidirectionally from a wide portion which forms a path of least reluctance for the electromagnets to a narrow portion which forms a path of higher reluctance. This type rotor is capable of rotating in only one direction and is particularly well adapted for use with a numeral dial to indicate the results obtained from a remotely located computer or the like.

In another form of the invention, the rotor band tapers in either direction from a wide portion to a diametrally opposed narrow portion. This type rotor is capable of rotating in either direction and is particularly well adapted for use with an angle indicator adapted to display the angular setting of a remotely located shaft or the like.

Other objects and features of the invention will become apparent from the following description when read in the light of the attached drawings of which Fig. 1 is a perspective view of an indicator constructed in accordance with the principle of the invention.

Figure 1:
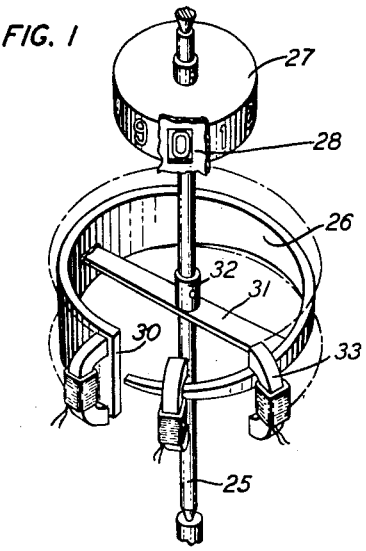

Referring to Fig. 1, the reference numeral 25 indicates a rotary shaft carrying a rotor 26 and an indicator dial 27 which in the illustrated instance of the invention is a numeral wheel having the digits 0-9 displayed thereon for individual surveyal from a viewing station 28.

Figure 2:
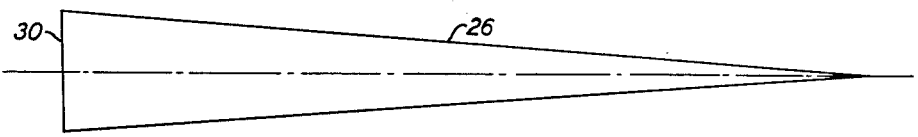
Fig. 2 is a plan view of a blank from which the rotor band of the indicator of Fig. 1 is formed.

Rotor 26 comprises a breached circular band of magnetizable material, said band tapering uniformly in axial width from a wide end 30 to substantially a point at its narrow end. Preferably, as shown in Fig. 2, the tapering edges of band 26 are in straight line paths so that the cross sectional area at any point differs from that at an immediately adjacent point by the same amount throughout the entire length of the band.

In order to mount rotor band 26 on shaft 25, a non-magnetic cross piece 31 is secured to diametrally opposed points on the band in any suitable manner that does not increase or decrease the magnetizable cross sectional area of the band at those points. A suitable hub 32 disposed centrally of cross piece 31 is secured on shaft 25.

Disposed about the periphery of band 26 in equally spaced positions are a plurality of electromagnets 33, one for each of the numerals displayed on dial 27. As here shown, each magnet 33 comprises a coil wound on a horseshoe of such dimensions that the wide end 30 of band 26 completely spans the pole pieces thereof. For obvious reasons, the radial space between the pole pieces of each magnet and the band 26 are held to a minimum.

In accordance with the magnetic principle that a flux field tends to establish a path of least reluctance, the energization of any magnet 33 effects a rotative movement of band 26 sufficient to position the wide end 30 thereof adjacent the energized magnet. This result is brought about by reason of the fact that the wide end 30 of the band provides a path of less reluctance than that provided by any other part of the band.

The arrangement is such that the energization of any magnet 33 brings into display position in window 28 the numeral of dial 27 which is associated with said magnet. If desired, means may be provided for energizing the zero magnet 33 after each display operation in order to provide a datum position from which the rotor is displaced during each operation thereof. Such may be of any suitable sort and may be either automatically or manually operated, whichever is more desirable.

Figure 3:
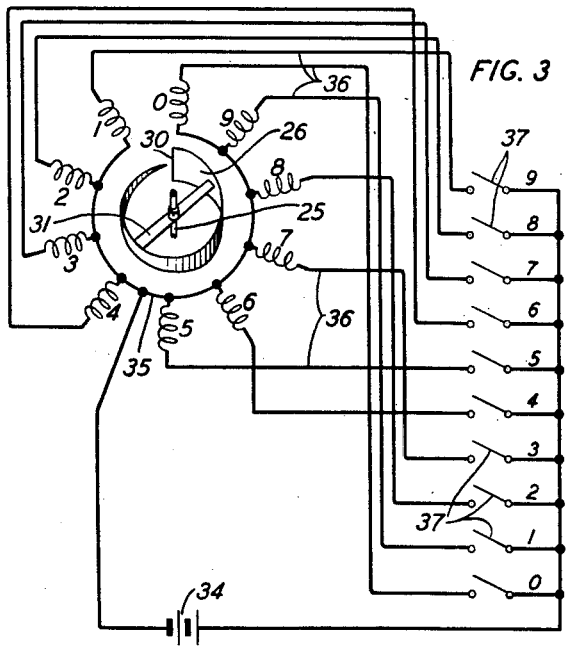
Fig. 3 is a wiring diagram which illustrates a simple way to control the indicator of Fig. 1.

A simplified circuit for energizing the magnets 33 selectively is illustrated in Fig. 3 and includes a source of potential 34, a common negative return 35 for all of the magnets, an individual control lead 36 for each magnet, a normally open switch 37 for each lead 36 and a common positive supply for all of the switches. It is readily apparent that closure of any switch 37 affects energization of the associated magnet.

According to the invention the switches 37 may be operated selectively by any desired means. For example, they may be closed by the keys of a keyboard, or may be closed automatically under control of the readout mechanism of the calculating machine or the like. In this latter respect, it is to be mentioned that the switches 37 may be replaced by the digital contacts or the like of a counting or an accumulating device.

It is obvious, therefore, that the described device is particularly well adapted for indicating the results of an operation of a remotely positioned calculator or the like.

Figure 4:
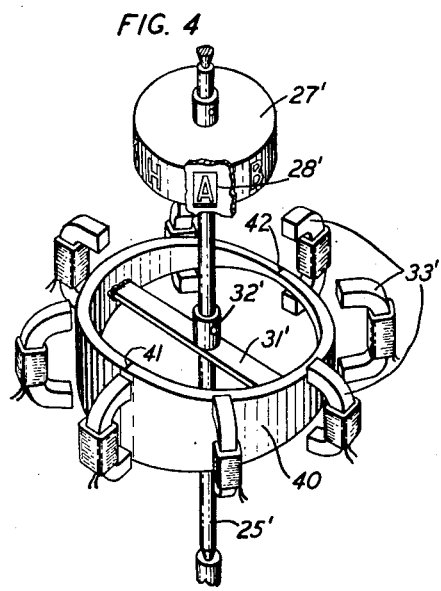
Fig. 4 is a perspective view of an indicator constructed in accordance with a modified form of the principle of the invention.
Figure 5:
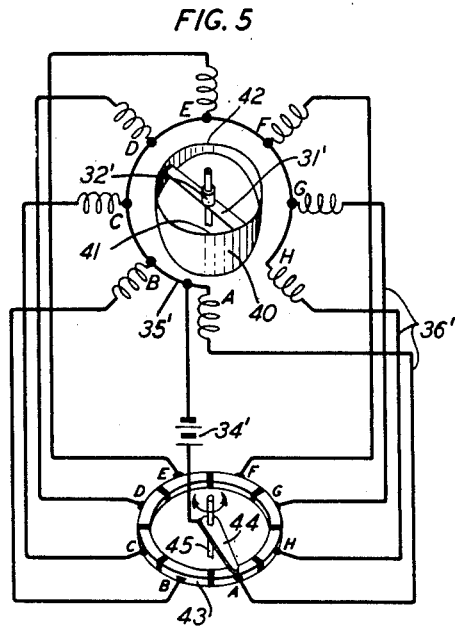
Fig. 5 is a wiring diagram which illustrates a simple way of controlling the indicator of Fig. 4.

Referring now to Figs. 4 and 5 wherein like parts are given the same reference numerals as hereinabove with a prime added, there is disclosed an indicator which may be utilized for indicating the angular position of a remotely located shaft, or for other similar purposes. In this arrangement the band 26 of Fig. 1 is replaced by an unbroken band 40 which tapers in axial width in both directions from a wide point 41 to a narrow point 42. Once again, the taper of the band is uniform throughout the peripheral length thereof. Because of its doubly tapered figuration, band 40 is capable of rotating in either direction to locate the wide point 42 thereof adjacent an energized magnet 33', the actual direction in which the band rotates being determined by the angular position of said wide point with respect to the energized magnet. For example, if the wide point 42 is displaced 45° from an energized magnet in a clockwise direction, it is 315° therefrom in a counterclockwise direction and rotor 40 will rotate counterclockwise 45°.

The circuit for operating the magnets for rotor 40 is illustrated in Fig. 5 and is very similar to the circuit of Fig. 3. Here, however, the individual control leads 36' for the magnets are connected each with a segment of a commutator 43, and the common negative line 35' is connected through battery 34' with a brush 44 which is differentially positioned to contact said segments selectively. Brush 44 is fixed on a shaft 45 which may be a shaft whose angular position it is desired to indicate on dial 27' or may be driven synchronously with or coupled to such a shaft. In short, shaft 45 is settable to differentially angular positions and these positions are indicated on dial 27', the dial turning with the shaft under control of brush 44 and commutator segments 43.

In Figs. 4 and 5, eight magnets 33' are illustrated and a like number of positions on dial 27 are designated by the letters a, b, c, etc., but it is to be understood that any desired number of magnets and dial designations may be provided in this or any of the other illustrated forms of this invention.

Figure 6:
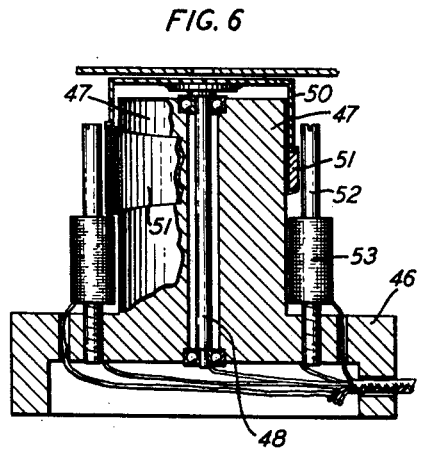
Fig. 6 is an elevational view, partly in sections, of a modified indicator structure which may be utilized whether in the manner set forth in Fig. 1 or in the manner set forth in Fig. 4.
Figure 7:
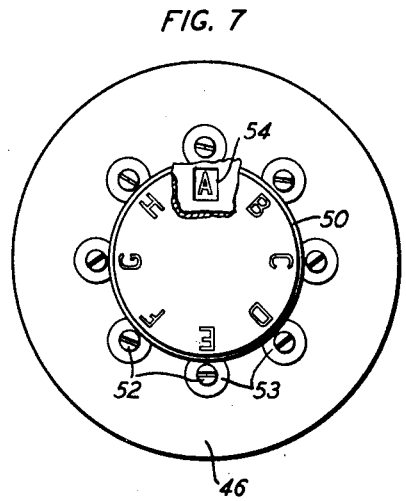
Fig. 7 is a plan view of the structure of Fig. 6.

Referring now to Figs. 6 and 7 there is disclosed a structure which may be utilized either with the rotor band 26 shown in Fig. 1 or the rotor band 40 shown in Fig. 4. In the illustrated instance rotor band 26 is utilized. The structure comprises a base 46 of magnetizable material having integral therewith a centrally disposed circular column 47. Mounted for rotation in the column 47 is a vertical shaft 48 of non-magnetic material. Shaft 48 projects a short distance above the column 47 and has mounted thereon a cap 50 which has peripheral walls embracing the upper portion of the column. Preferably, cap 50 is molded of a suitable plastic material although any other non-magnetic material may be utilized. The lower end of the peripheral wall of cap 50 tapers to complement the upper edge of a rotor band 51 which is identical with the band 26 illustrated in Fig. 1 and which is secured to said wall in any suitable manner such as by gluing.

Secured in base 46 in equally spaced positions around the column 47 are a plurality of posts 52 each having wound thereon below the band 51 a coil 53 and each having its upper end on a level with the highest point of band 51. The coils 53 may be energized selectively in any of the ways indicated hereinabove or in any other suitable way. For each coil 53 and post 52 a suitable designatory symbol is displayed atop cap 50 for viewing through a window 54 or the like as illustrated in Fig. 7.

The described arrangement is such that the energization of a coil 53 sets up a flux path from the associated post 52 through the rotor band 51 and column 47. As described above, this effects rotation of said band to position the widest point thereof adjacent the active post, and the appropriate designation on cap 50 is presented to window 54.

While there have been described a limited number of forms of the invention, it is obvious that many modifications and changes can be made without departing from the spirit of the invention and no limitations are placed on the invention except as set forth in the following claim and as dictated by the prior art.

I claim:

In an indicator of the class described, a base of magnetic material having a circular column projecting upward therefrom, a circular band of magnetizable material which tapers axially from a wide portion to a narrow portion, said band encircling said column and being mounted for rotative movements to locate said wide portion in a plurality of angular positions, a post projecting upward from said base in each said position, and located immediately adjacent the band, a coil wound on each post below the band, the coils being energizable selectively and the upper ends of the posts being so located as to utilize the material of the band as a low reluctance path, and a cap mounted on said band and embracing the upper end of said column, said cap having designatory indicia displayed therein.

WALTER S. OLIWA.

REFERENCES CITED

The following references are of record in the file of this patent:

UNITED STATES PATENTS

| Number | Name | Date |
|--------|------|------|
| 1,408,555 | Wood | Mar. 7, 1922 |
| 1,504,609 | Crane | Aug. 12, 1924 |
| 1,657,855 | Decker | Jan. 31, 1928 |